United States Patent
Kim et al.

(10) Patent No.: US 6,227,276 B1
(45) Date of Patent: May 8, 2001

(54) APPARATUS FOR REMOVING A POLARIZER OF A LIQUID CRYSTAL DISPLAY

(75) Inventors: Do-Whan Kim; Young-Gil Kim, both of Kyungki-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

(21) Appl. No.: 09/234,293

(22) Filed: Jan. 21, 1999

(30) Foreign Application Priority Data

Jan. 21, 1998 (KR) .................................... 98-1708

(51) Int. Cl.⁷ .................................................. B32B 35/00
(52) U.S. Cl. ..................... 156/584; 156/344; 156/247; 156/254; 83/27; 83/107; 83/433; 83/874
(58) Field of Search ........................ 156/344, 584, 156/247, 254; 83/27, 56, 102, 107, 433, 870, 874

(56) References Cited

U.S. PATENT DOCUMENTS

| | | | |
|---|---|---|---|
| 4,685,991 | * 8/1987 | Herrmann et al. | 156/584 X |
| 4,956,044 | * 9/1990 | Watanabe et al. | 156/584 X |
| 5,022,951 | * 6/1991 | Behlmer et al. | 156/584 X |
| 5,091,042 | * 2/1992 | Bruckner | 156/344 X |
| 5,282,918 | * 2/1994 | Heist et al. | 156/584 X |
| 5,368,678 | * 11/1994 | Miyamoto et al. | 156/584 X |
| 5,498,305 | * 3/1996 | Mailloux | 156/344 X |
| 5,676,789 | * 10/1997 | Hamamura | 156/584 X |

FOREIGN PATENT DOCUMENTS

| | | | |
|---|---|---|---|
| 58-59062 | * 11/1988 | (JP) | 156/344 |
| 63-288721 | * 11/1988 | (JP) | 156/584 |

* cited by examiner

Primary Examiner—Mark A. Osele
(74) Attorney, Agent, or Firm—Howrey Simon Arnold & White, LLP

(57) ABSTRACT

For removing a polarizer from a liquid crystal display automatically, a device for removing a polarizer of liquid crystal display includes a holder, a separator, a first moving member, a damper and a second moving member. The holder fixes liquid crystal display. The separator separating an edge of a polarizer from the panel by inserting between the polarizer and the panel. The first moving member moves the separator. The clamping member holds the edge of the polarizer separated from the panel. The second moving member moves the first moving member and the separator together to separate the polarizer from the panel. The fixing member may include a vacuum adsorber, and it has an adsorption plate provided on the surface of which liquid crystal display is laid. The separator has a sharp edge to be easily inserted between the panel and the polarizer. The first moving member and the second moving member include a hydraulic cylinder, a pneumatic cylinder, a servomotor and a ball screw system. The clamping member has a fixing member coupled to the separator, a moving member, a clamping cylinder coupled to the moving member to move toward or away from the fixing member.

13 Claims, 8 Drawing Sheets

APPARATUS FOR REMOVING A POLARIZER OF A LIQUID CRYSTAL DISPLAY

BACKGROUND OF THE INVENTION (a) Field of the Invention

The present invention relates to an apparatus for removing a polarizer of liquid crystal display.

(b) Description of the Related Art

A liquid crystal display includes a pair of glass substrates having a gap therebetween, sealant sealed up edges of the glass substrate, a liquid crystal interposed in the gap between the substrates and enclosed by the sealant, a plurality of electrodes formed on the inner surfaces of the substrates and generating electric fields to rearrange the liquid crystal molecules, a pair of alignment films which are formed on the electrodes and aligns the liquid crystal molecules, and a pair of polarizers attached to the outer surfaces of the substrates.

In the manufacturing process of the liquid crystal display, when the polarizers goes wrong, the polarizers are peeled off and new polarizers are attached.

In a conventional method of removing the bad polarizer, one corner of the polarizer are lifted using a sharp knife, and the polarizer is peeled off manually. In this step, the worker may be hurt by the sharp corner of the polarizer.

Furthermore, removal of the polarizer is very laborious, and thus the product yield may be reduced.

SUMMARY OF THE INVENTION

It is therefore an object of the present invention to provide a device for automatically removing a polarizer of a liquid crystal display.

A polarizer removing device according to the present invention includes a fixing member fixing a liquid crystal display including a panel and a polarizer attached to the panel, a separator which separates an edge of a polarizer from the panel by inserting itself between the polarizer and the panel, a first moving member transferring the separator, a clamping member clamping the edge of the polarizer separated from the panel, and a second moving member moving the clamping member to separate the polarizer from the panel.

The fixing member may include a vacuum adsorber, and they have an adsorption plate provided on the surface that the liquid crystal display contacts.

The separator has a sharp edge to be easily inserted between the panel and the polarizer.

The first moving member and the second moving member may include a hydro-cylinder, a pneumatic cylinder or a servomotor.

The clamping member has a fixing member coupled to the separator, a moving member installed to the fixing member with a gap, and a clamping cylinder coupled to the moving member to move toward or away from the fixing member.

A device for removing a polarizer of the present invention removes the polarizer from the panel. When the liquid crystal display is fixed by adsorption plate of vacuum adsorber of holder, a sharp edge of the separator is located in the edge part of the liquid crystal display. The separator gets inserted between the polarizer and the panel to separate the corner of the polarizer from the panel. When the clamping member clamps the edge of the polarizer separated from the panel, the second moving member moves the clamping member.

DETAILED DESCRIPTION OF THE PREFERRED EMBODIMENTS

The present invention now will be described more fully hereinafter with 20 reference to the accompanying drawings, in which preferred embodiments of the invention are shown.

As shown in FIGS. 1–4, a polarizer remover of a liquid crystal display according to the present invention includes a fixing member fixing a liquid crystal display 2, a separator 20 which separates an edge of a polarizer 6 from the panel 4 by inserting itself between the polarizer 6 and panel 4, a first moving member transferring the separator 20, a clamping member clamping the edge of the polarizer 6 separated from the panel 4, and a second moving member moving the member to separate the polarizer 6 from the panel 4.

The polarizer remover further includes a controller (not shown) controlling the fixing member and the first moving member, the clamping member and the second moving member.

Figure 1:
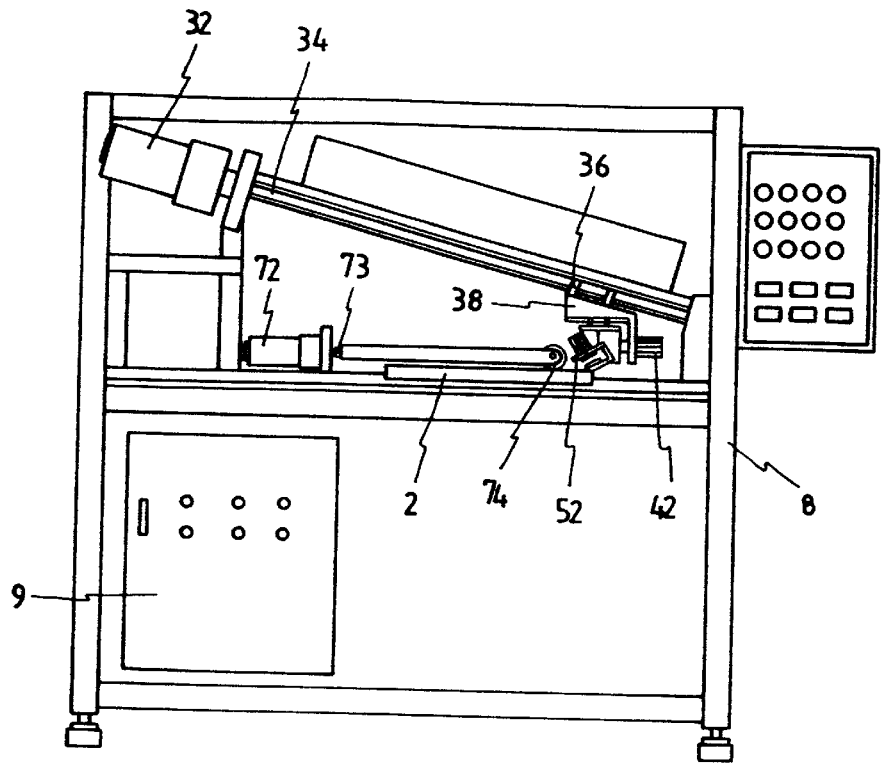
FIGS. 1 and 2 are a front view and a plan view of device for removing a polarizer of a liquid crystal display according to an embodiment of the present invention.

The fixing member and the second moving member are installed in a frame 8, on a control box 9 supplying a control signal to the control member, as shown in FIG. 1.

Figure 4:
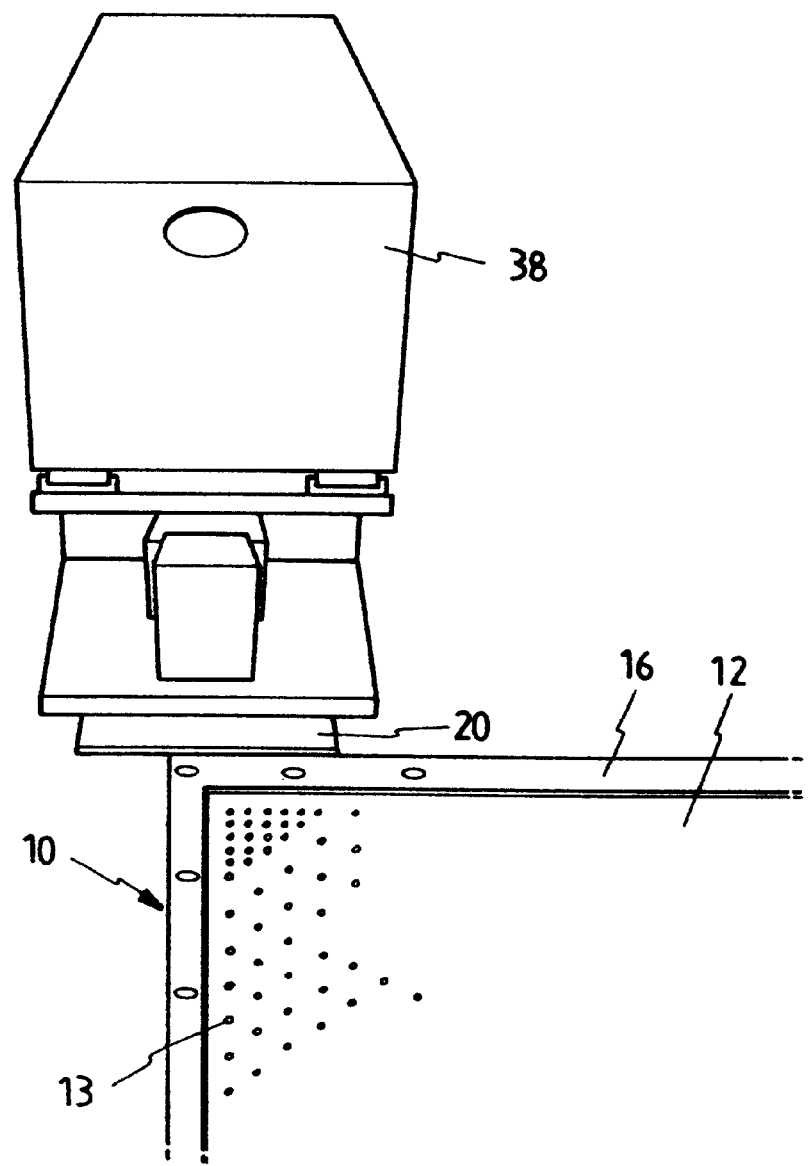
FIG. 4 is a perspective view of the polarizer removing device in FIGS. 1 and 2.

The fixing member includes a vacuum adsorber, as shown in FIG. 4, and a working plate 10 on which an adsorber plate 12 is placed, and a liquid crystal display mount thereon.

The working plate 10 is installed to rotate, especially to rotate around the edge near the separator 20 as a center of rotation.

Furthermore, when the liquid crystal display 2 is on the adsorb plate 12, a fixing jig 16 is provided such that only the polarizer rises up.

Since a conventional vacuum adsorber can be employed for the present invention, a detailed description is omitted.

The separator 20 has a sharp edge like a knife blade to be easily inserted between the glass substrate 4 and the polarizer 6.

Figure 3:
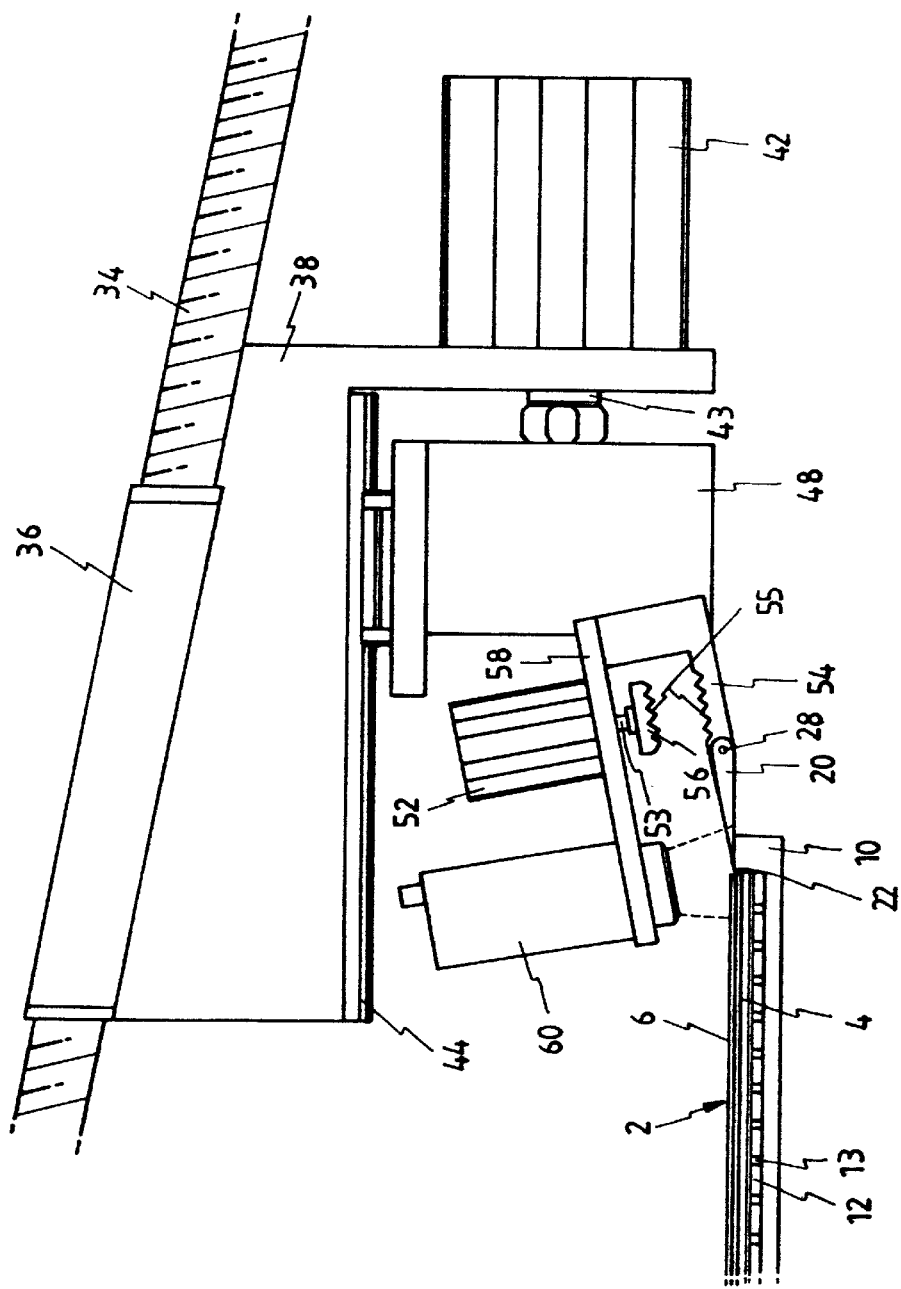
FIG. 3 is an enlarged view the polarizer removing device in FIGS. 1 and 2.

As shown in FIG. 3, the second moving member has a servomotor and a ball screw system. A ball screw shaft 34 is provided at the frame 8, and the servormotor 32 rotates the ball screw shaft 34. A ball nut 36 is coupled to the ball screw shaft 34 and moves according to the rotation of the ball screw shaft 34. A moving bracket 38 is provided at the ball nut 36.

The ball screw shaft 34 makes an angle with the liquid crystal display 2 such that the clamping member clamping the polarizer separated from the panel moves away from the working plate 10.

Figure 2:
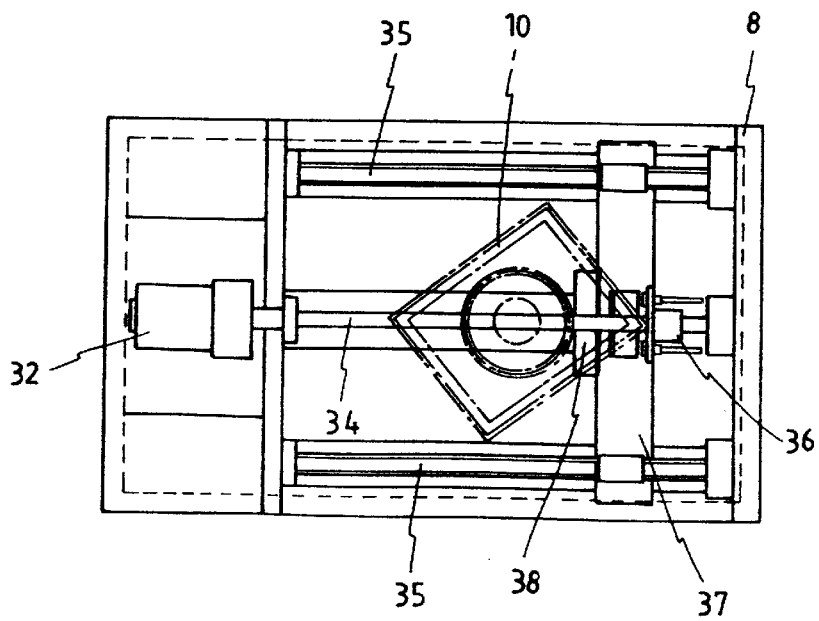

As shown in FIG. 2, the second moving member further includes at least one guide bar 35 and a connecting member 37. The guide bar 35 is parallel to and separated from the ball screw shaft 34. The connecting member 37 is movably coupled to the guide bar 35 and moves together with the ball nut 36.

This embodiment shows two guide bars 35.

Although this embodiment was the second moving member including the servomotor and the ball screw system, the second moving member may include a hydraulic cylinder, a pneumatic cylinder, or a rodless cylinder.

As shown in FIG. 3, the first moving member includes a separating cylinder 42, a guide rail 44 and a separating bracket 48. The separating cylinder 42 is provided at the moving bracket 38 of the second moving member. The guide rail 44 is installed at the moving bracket 38 parallel to the working plate. The separating bracket 48 is movably installed along the guide rail 44 and coupled to a piston rod 43 of the separating cylinder 42.

The separating cylinder 42 is a hydraulic cylinder or a pneumatic cylinder.

Although the first moving member in this embodiment uses a cylinder, it may use a servomotor or a ball screw system.

As shown in FIG. 3, the clamping member includes a fixing member 54, a clamping bracket 58, a clamping cylinder 52 and a moving member 56. The fixing member 54 is installed at the separating bracket 48, and the separator 20 is provided at one end of the fixing member 54. The clamping bracket 58 is installed separated from the fixing member 54. The clamping cylinder 52 is installed at the clamping brackets 58. The moving member 56 is installed on the piston rod 53 of the clamping cylinder 52 and moves toward or away from the fixing member 54.

The clamping cylinder 52 may be a hydraulic cylinder or a pneumatic cylinder.

Although clamping member in this invention uses a cylinder system, it may use a servomotor or a ball screw system.

The clamping surfaces 55 of the fixing member 54 and the moving member 56 are saw-toothed in order to concretely clamp the polarizer.

The clamping surfaces 55 are inclined with respect to the liquid crystal display such that the edge closer to the liquid crystal display is located lower than the opposite edge.

At an end portion of clamping bracket 58 corresponding to an end of separating member 20, a sensor 60 for detecting an edge of the polarizer is located.

The separator 20 is installed through a rotating pin 28 at a fixing member 54 such that the separator 20 rotates according to a rotational torque.

Figure 9:
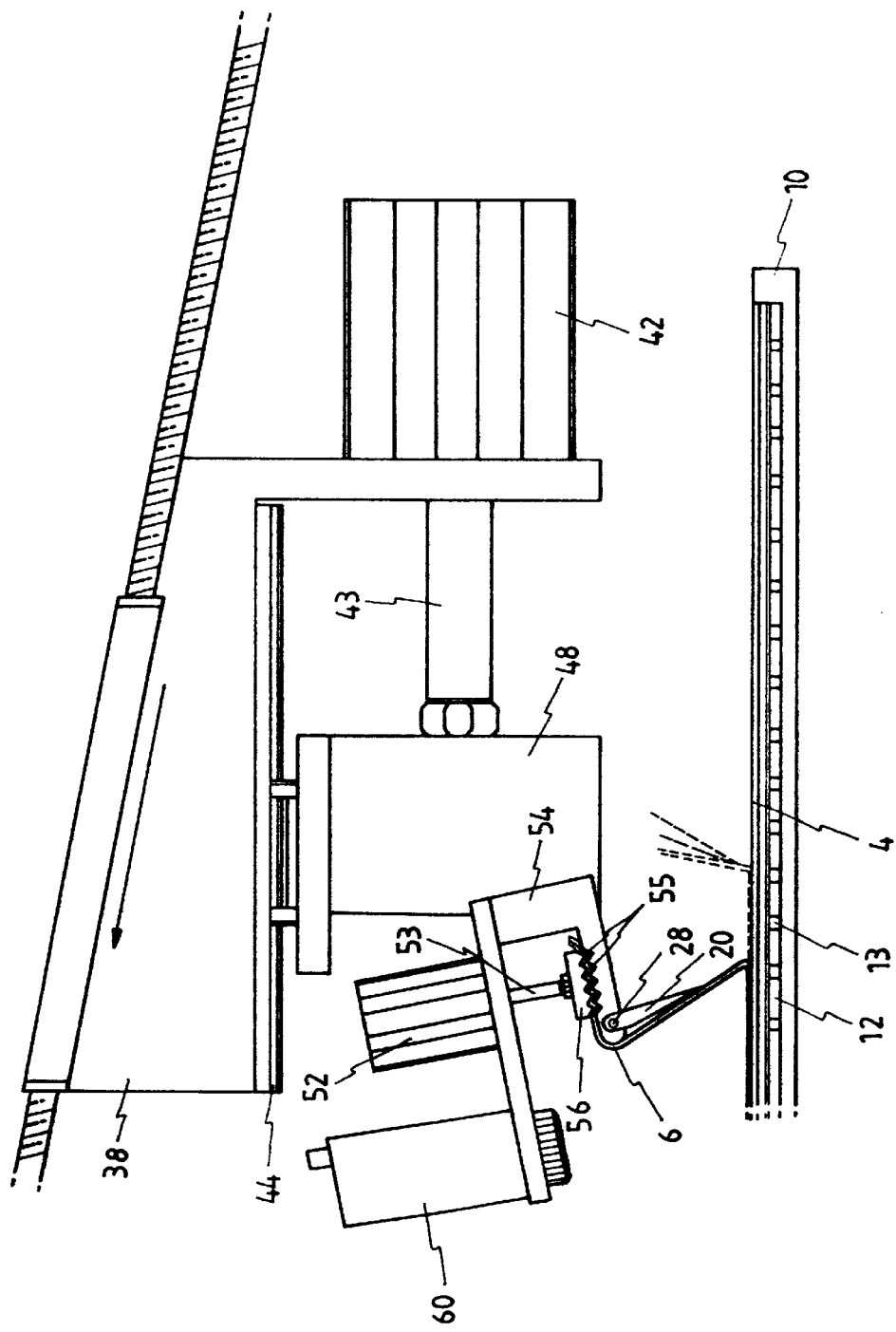
FIG. 9 is an enlarged view of the polarizer when a second moving member is in an operating state.

For example, when the separator 20 separates the polarizer 6 of the panel 4, the separator 20 remains fixed by a torsion spring (not shown). When the second moving member moves the fixing member 54, the separator 20 rotates about the rotating pin 28 by the moving force of the second moving member. This overcomes elasticity force of torsion spring. So the sharp edge of the separator 20 is prevented from damaging the porarizer 6 (shown FIG. 9).

As shown in FIG. 1, the polarizer remover comprises a pushing member. The pushing member operates in response to the operation of the second moving member and push the liquid crystal display 2 to protect deformation of panel 4 while the polarizer 6 is separated from the panel 4.

The pushing member includes a pushing cylinder 72, and a pushing roller 74.

The pushing cylinder 72 is installed at frame 8, and the pushing roller 74 is rotatally installed at a piston rod 73 of the pushing cylinder 72.

Although the pushing member in this embodiment uses a cylinder system, it may use a servomotor and a ball screw system.

Next, the operation of the polarizer remover according to an embodiment of the present invention is described.

Figure 5:
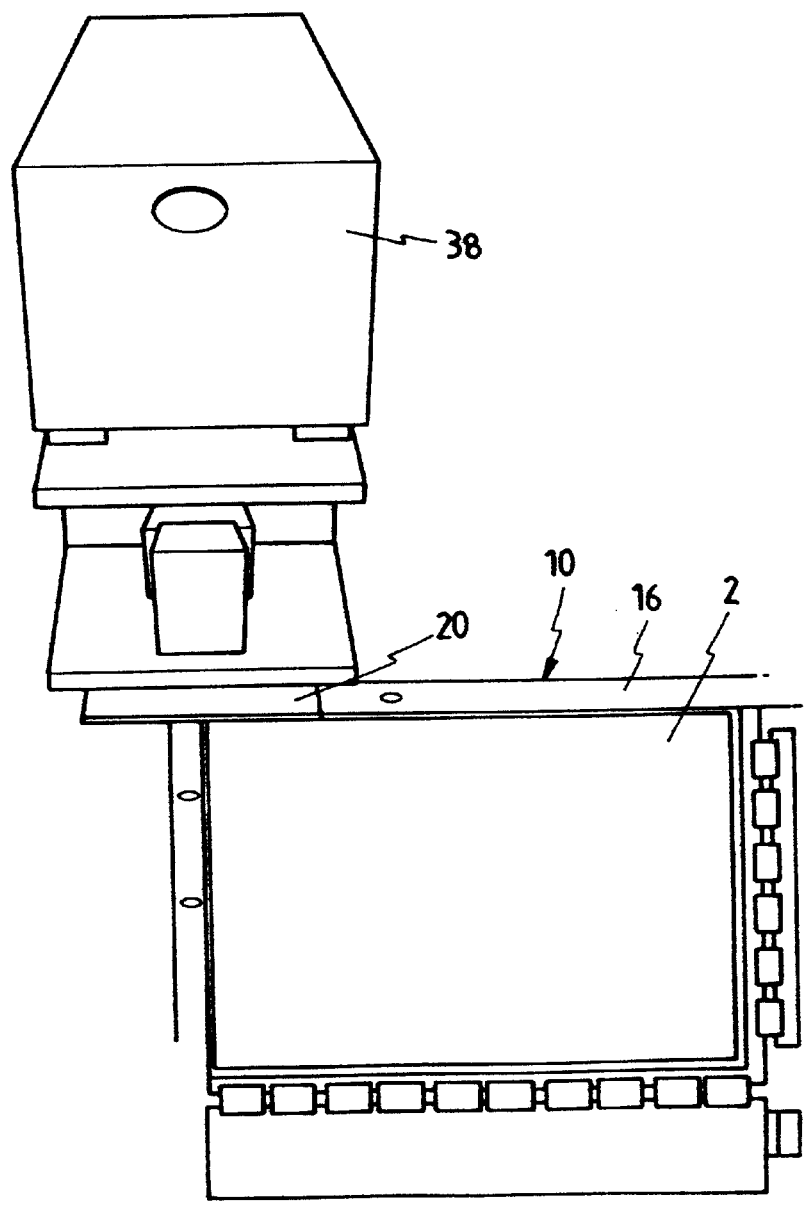
FIG. 5 is a perspective view of the polarizer removing device when a liquid crystal display is loaded on a working plate.

When a polarizer of a liquid crystal display turns out to be wrong due to impurities accidentally involved between a panel and the polarizer, misattachment of the polarizer, or damages on the polarizer, as shown in FIG. 5, the liquid crystal display is loaded on the adsorb plate 12 by using a transferring system (not shown). At this time, the liquid crystal display 2 is located on the adsorbing plate 12 such that the polarizer 6 is projected over the fixing jig 16, and an edge of the polarizer 6 closely contact the fixing jig 16. The liquid crystal display 2 is adsorbed on the adsorbing plate 12 by the vacuum adsorber, and the servomotor 32 of the second moving member begins to rotate by a control signal of the controller (not shown). The ball screw shaft 34 rotates according to the rotation of the servomotor 32, the separator 20 moves toward the liquid crystal display 2.

Figure 6:
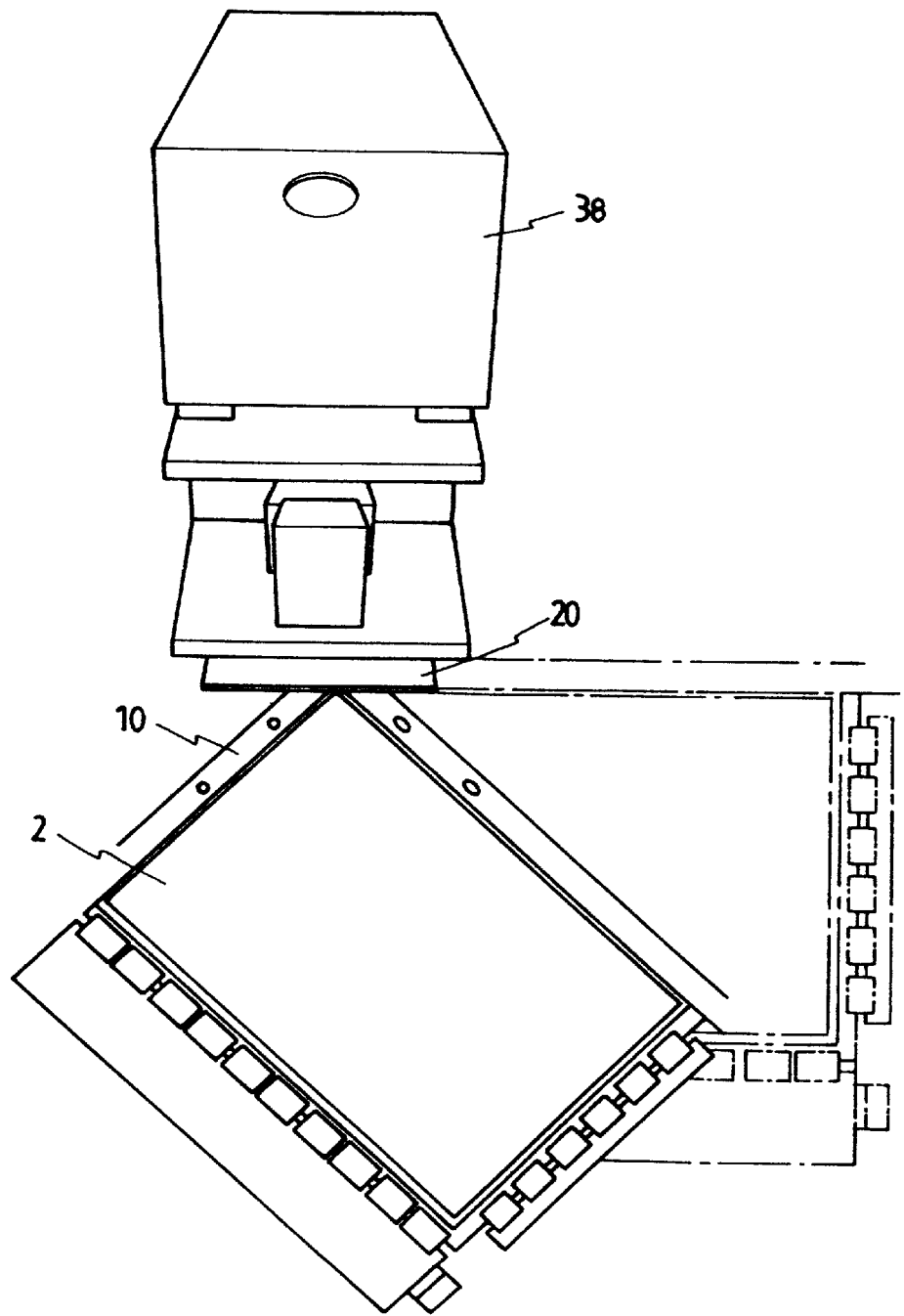
FIG. 6 is a perspective view of the polarizer showing the rotated working plate.
Figure 7:
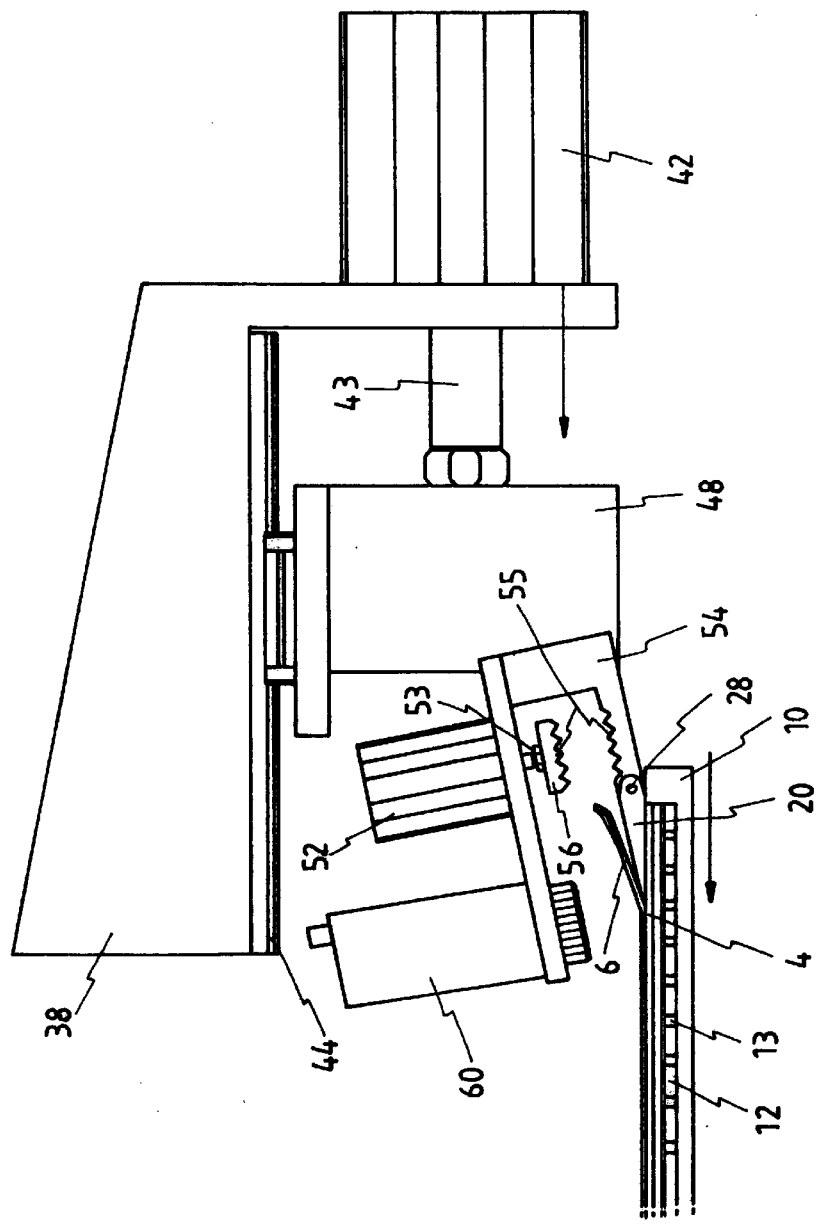
FIG. 7 is an enlarged view of the polarizer when a moving member is in an operating state.

The position of the polarizer 6 of the liquid crystal display 2 is detected by the sensor 60, and when an edge of the polarizer is close to the separator 20, the servomotor 32 of the second moving member stops by the control signal of controller As shown in FIG. 6, the working plate 10 rotates along the corner of polarizer such that the corner rotates from the dot-dash line to the solid line. As shown in FIG. 7, the separating bracket 48 moves toward the polarizer 6 along the guide rail by the separating cylinder 42 of the first moving member in response to the signal from the controller.

Then, the fixing member 54 and the separator 20 move toward the polarizer 6 and the separator 20 is inserted between the polarizer and the panel 4 to separate the corner of the polarizer 6 from the panel 4. When the separated portion of the polarizer 6 is placed between the clamping surfaces 55 of the fixing member 54 and the moving member 56 and the size of the separated portion becomes proper, the clamping cylinder 52 of the clamping member operate in response to the control signal of controller to move the moving member 56 toward the fixing member until the separated portion of the polarizer is clamped between the clamping surfaces 55.

Figure 8:
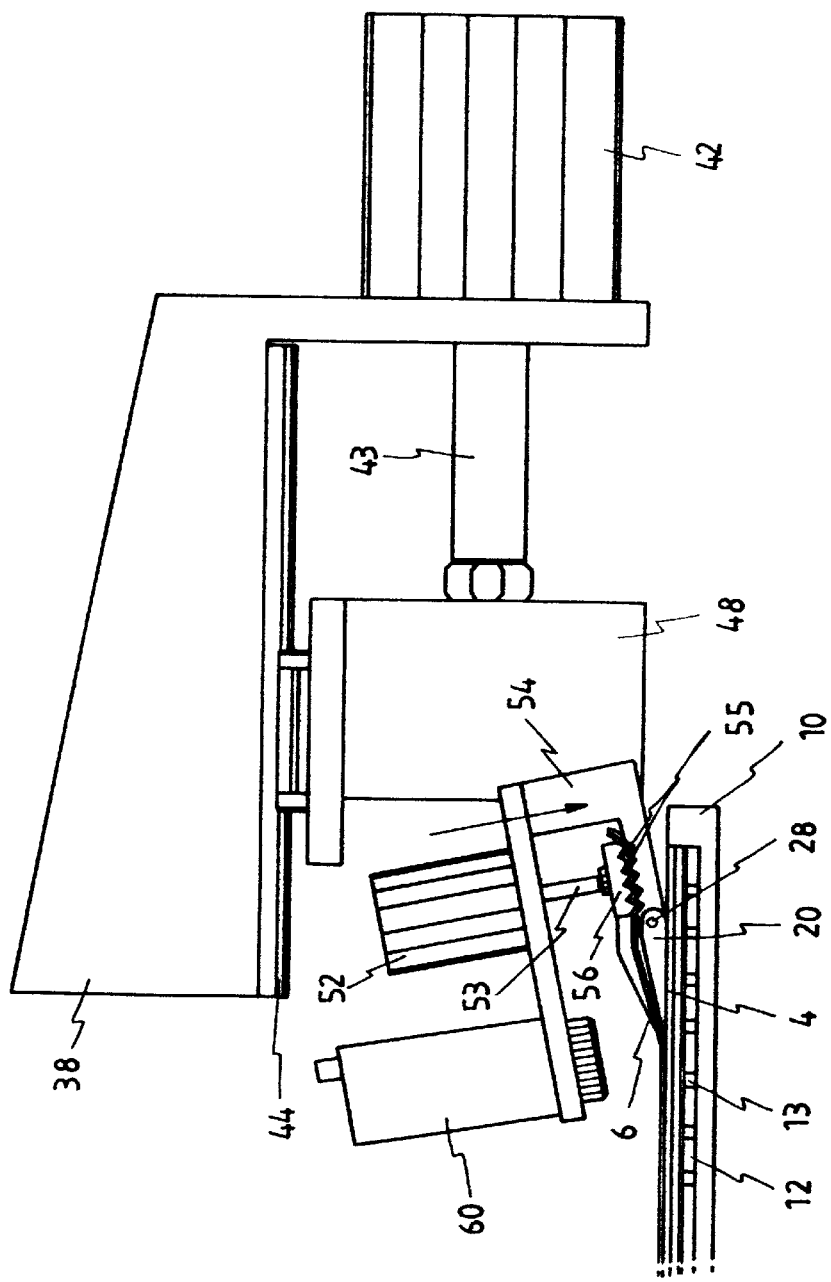
FIG. 8 is an enlarged view of the polarizer when a clamping member is in an operating state.

The servomotor 32 of the second moving member rotates in response to the control signal of the controller to move the moving bracket 38 via the ball nut 36 coupled to the ball screw shaft 34. The moving direction of the moving bracket 38 is left in FIG. 8 such that the polarizer 6 is detached from the panel 4. Since the ball screw shaft 34 makes an angle with the working plate 10, the clamping surfaces 55 moves upward and left.

As the polarizer 6 begins to separate, the sharp edge of the separator 20 is subject to a left-hand movement by the polarizer 6, and the edge is rotated about the rotating pin 28 to prevent the damage on the polarizer 6.

The pushing cylinder 72 operates according to the control signal from the controller when the second moving member operates, and the pushing roller 72 moves left to prevent the panel 4 from being damaged.

The polarizer 6 is completely detached from the panel the vacuum adsorber stops its operation, and the liquid crystal display 2 can be removed from the adsorb plate 12 to proceed to the next process.

Although the present invention uses this embodiment, it may use various kinds of embodiments.

The present invention increases productivity by automatically removing the polarizer without injuring a worker.

What is claimed is:

1. A device for removing a polarizer of a liquid crystal display, comprising:

a holder holding a liquid crystal display having a panel and a polaruzer attached thereto;

a separator separating an edge portion of the polarizer from the panel;

a first moving member moving the separator;

a clamper holding the separated edge portion of the polarizer; and a second moving member moving the damper to completely separate the polarizer from the panel, wherein the separator comprises a blade that is inserted between the edge portion of the polarizer and the panel.

2. The device of claim 1, wherein the separator is rotatable.

3. The device of claim 1, wherein the holder comprises a working plate, a vacuum adsorber and an adsorbing plate installed on the working plate having a plurality of adsorbing holes.

4. The device of claim 3, wherein the working plate is rotatable.

5. The device of claim 1, wherein the second moving member comprises: a ball screw shaft;

a servomotor rotating the ball screw shaft; and a ball nut which is coupled to the ball screw shaft and moves according to the rotation of the ball screw shaft.

6. The device claim 5, wherein the ball screw shaft makes an angle with the liquid crystal display loaded on the holder.

7. The device of claim 5, wherein the second moving member further comprises:

at least one guide bar substantially parallel to the ball screw shaft; and a connecting member movably coupled to the guide bar and moving along with the ball nut.

8. The device of claim 1, wherein the first moving member comprises:

a separating cylinder coupled to the second moving member and having a piston rod;

a guide rail parallel to the liquid crystal display loaded on the holder; and a separating bracket movably coupled to the guide rail to move along the guide rail and the piston rod of the separating cylinder.

9. The device of claim 1, wherein the damper comprises:

a fixed member having opposite ends, one end coupled to the separator and the other end coupled to the first moving member;

a clamping bracket separated from the fixing member;

a clamping cylinder coupled to clamping bracket and having a piston rod; and a third moving member coupled to the piston rod of the clamping cylinder to move toward or away from the fixed member and facing the fixed member.

10. The device of claim 9, wherein facing surfaces of the fixed member and the third moving member are tooth-shaped.

11. The device of claim 9, wherein the facing surfaces of the fixed member and the third moving member make an angle with the liquid crystal display loaded on the holder.

12. The device of claim 9, further comprising a sensor coupled to the clamping bracket for sensing an edge of the polarizer.

13. The device of claim 1, further comprising a pushing member for pushing the liquid crystal display loaded on the holder.

* * * * *